United States Patent
Sano et al.

(10) Patent No.: US 7,312,931 B2
(45) Date of Patent: Dec. 25, 2007

(54) ZOOM LENS AND IMAGE PICKUP APPARATUS

(75) Inventors: Eigo Sano, Hino (JP); Atsushi Yamashita, Sagamihara (JP)

(73) Assignee: Konica Minolta Opto, Inc., Tokyo (JP)

( * ) Notice: Subject to any disclaimer, the term of this patent is extended or adjusted under 35 U.S.C. 154(b) by 0 days.

(21) Appl. No.: 11/526,640

(22) Filed: Sep. 26, 2006

(65) Prior Publication Data

US 2007/0109663 A1    May 17, 2007

(30) Foreign Application Priority Data

Sep. 29, 2005    (JP)    ............................. 2005-284995

(51) Int. Cl.
*G02B 15/14* (2006.01)
(52) U.S. Cl. ........................................ 359/683; 359/684
(58) Field of Classification Search ................ 359/676, 359/683, 684
See application file for complete search history.

(56) References Cited

U.S. PATENT DOCUMENTS

2007/0070513 A1*    3/2007    Yamashita et al. .......... 359/676

* cited by examiner

*Primary Examiner*—Scott J. Sugarman
(74) *Attorney, Agent, or Firm*—Finnegan, Henderson, Farabow, Garrett & Dunner, L.L.P.

(57) ABSTRACT

The present invention provides a zoom lens provided with, in order from an object side: a first lens group having a positive refractive power whose position on the optical axis is fixed during a zooming operation and a focusing operation; a second lens group having a negative refractive power; a third lens group having a positive refractive power; a fourth lens group having a positive refractive power; a fifth lens group having a negative refractive power; and a sixth lens group having a positive refractive power. The first lens group includes a reflection optical element. At least the fifth lens group is used for focusing on an object at a finite distance. The maximum lateral magnification of the predetermined lens groups between a wide-angle end and a telephoto end of the zoom lens and focal lengths of the zoom lens satisfy a predetermined condition.

10 Claims, 10 Drawing Sheets

ZOOM LENS AND IMAGE PICKUP APPARATUS

This application is based on Japanese Patent Application No. 2005-284995 filed on Sep. 29, 2005, in Japanese Patent Office, the entire content of which is hereby incorporated by reference.

TECHNICAL FIELD

The present invention relates to a zoom lens that forms an optical image on a solid-state image sensor such as a CCD type image sensor or a CMOS type image sensor, and to an image pickup apparatus.

BACKGROUND

In recent years, with a trend toward a greater number of pixels of a solid-state image sensor, there are increasing demands for a zoom lens having higher image forming capability and higher zoom ratio, for a small-sized digital camera and a small sized video camera carrying a small-sized image pickup unit equipped with a solid-state image sensor such as a CCD (Charge Coupled Devices) type image sensor or a CMOS (Complementary Metal-Oxide Semiconductor) type image sensor. In addition, a zoom lens for a small-sized image pickup unit is requested to be further smaller in size.

There is provided, for example, a small-sized zoom lens for a small-sized image pickup apparatus including a first lens group having positive refractive power, a second lens group having negative refractive power, a third lens group having positive refractive power, a fourth lens group having positive refractive power, a fifth lens group having negative refractive power, and a sixth lens group having positive or negative refractive power, and the small-sized zoom lens is provided with a prism for bending an optical path arranged in the first lens group in order to make a zoom lens to be thin in its thickness, as disclosed in TOKUKAI No. 2005-195757.

However, the disclosed zoom lens has problems that the zoom ratio is as small as about 3× though 5×, and its total length is long for its zoom ratio.

SUMMARY

In view of the aforesaid problems, the present invention provides a small-sized zoom lens and image pickup apparatus having high image forming capability and having a zoom ratio of about 7× though 8×, which are especially suitable for a digital camera and a video camera employing a solid-state image sensor having large amount of pixels.

A structure according to the present invention is a zoom lens for zooming by moving a plurality of lens groups, including, in order from an object side thereof along an optical axis: a first lens group having a positive refractive power whose position on the optical axis is fixed during a zooming operation and a focusing operation; a second lens group having a negative refractive power; a third lens group having a positive refractive power; a fourth lens group having a positive refractive power; a fifth lens group having a negative refractive power; and a sixth lens group having a positive refractive power. The first lens group includes a reflection optical element for bending an optical path by reflecting a light flux. In the zoom lens, at least the fifth lens group is used for focusing on an object at a finite distance. The maximum lateral magnification of the predetermined lens groups between a wide-angle end and a telephoto end of the zoom lens and focal lengths of the zoom lens satisfy a predetermined condition.

BRIEF DESCRIPTION OF THE DRAWINGS

Embodiments will now be described, by way of example only, with reference to the accompanying drawings which are meant to be exemplary, not limiting, and wherein like elements numbered alike in several Figures, in which.

Figure 4:
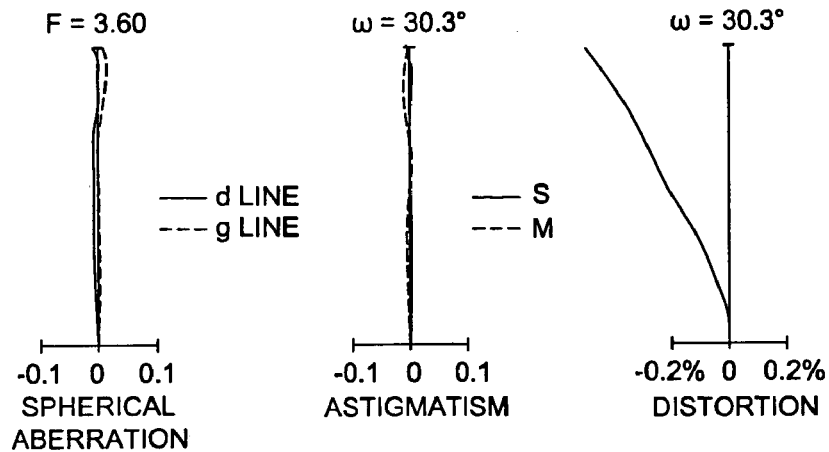
Figure 4:
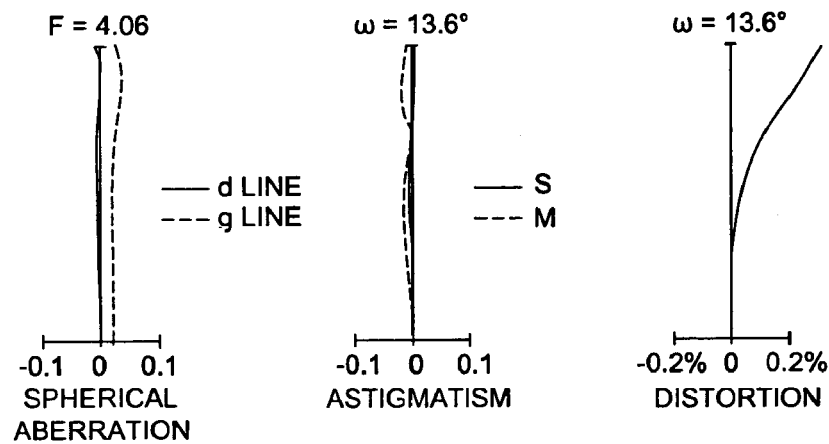
Figure 4:
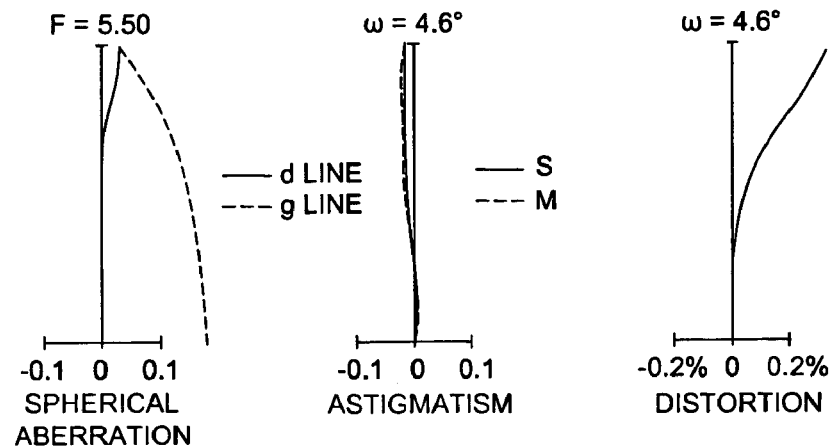
Figure 5:
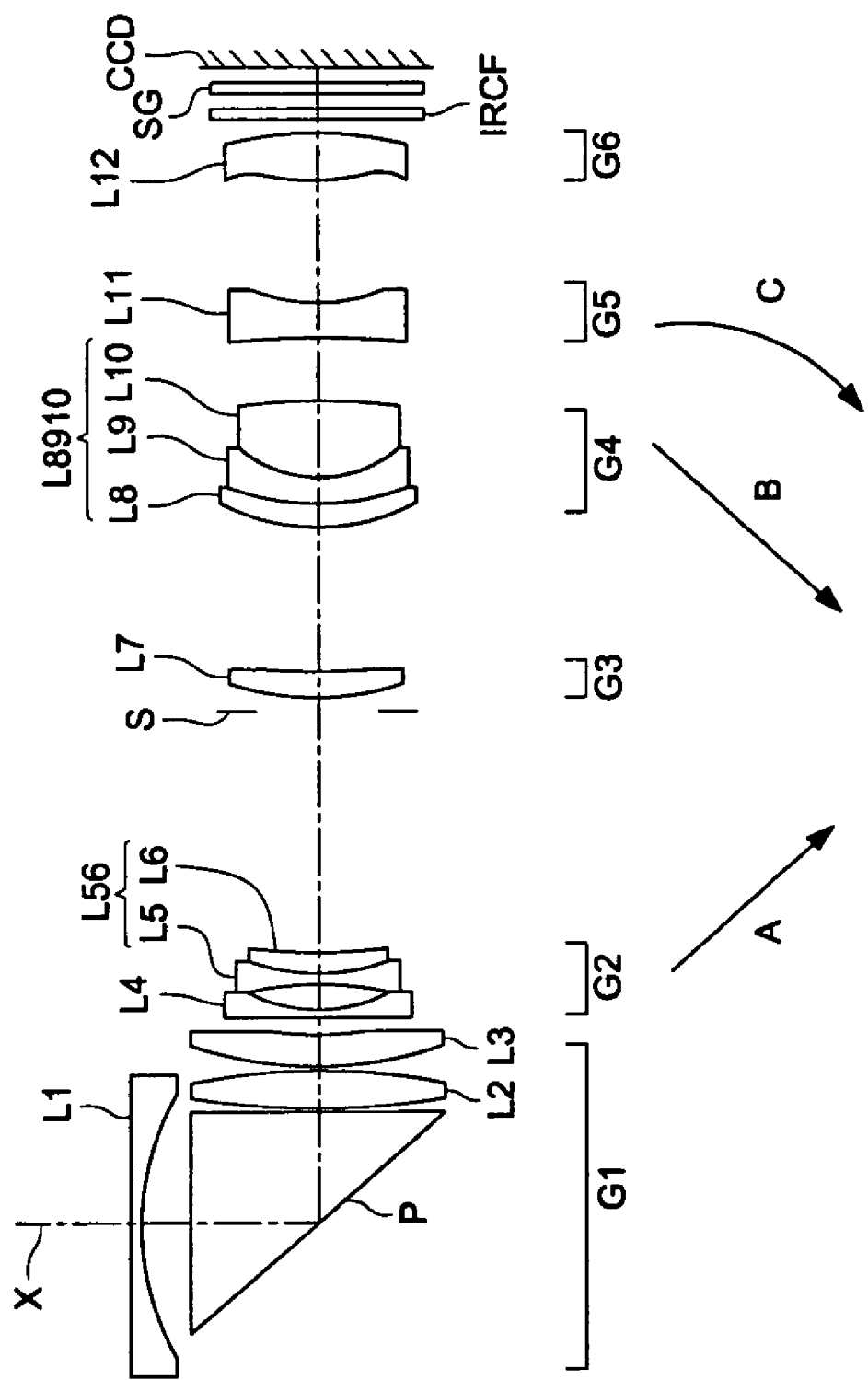
Figure 6:
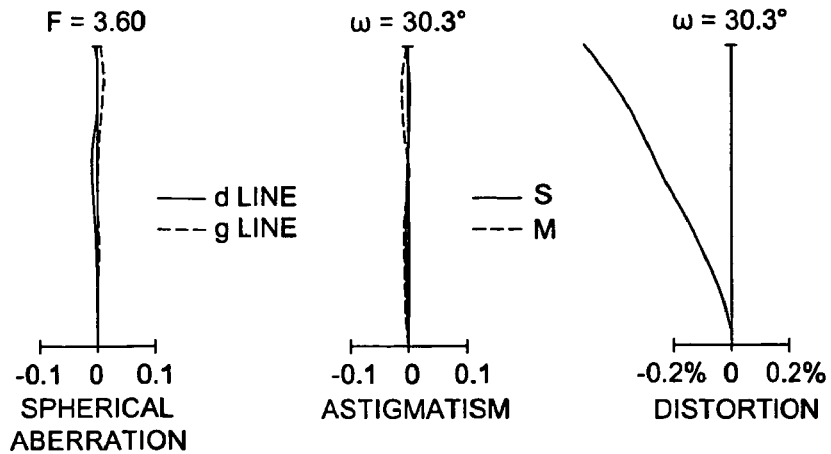
Figure 6:
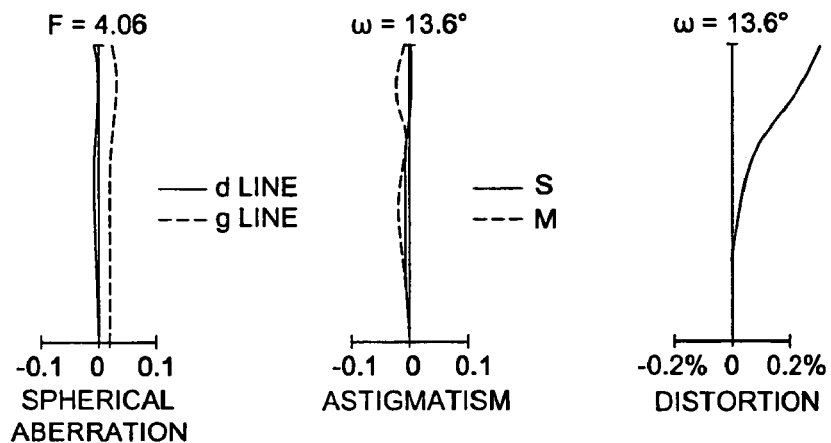
Figure 6:
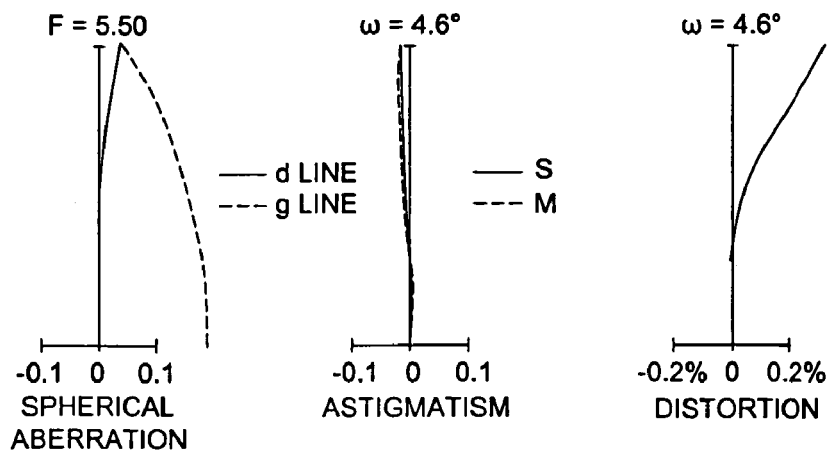
Figure 7:
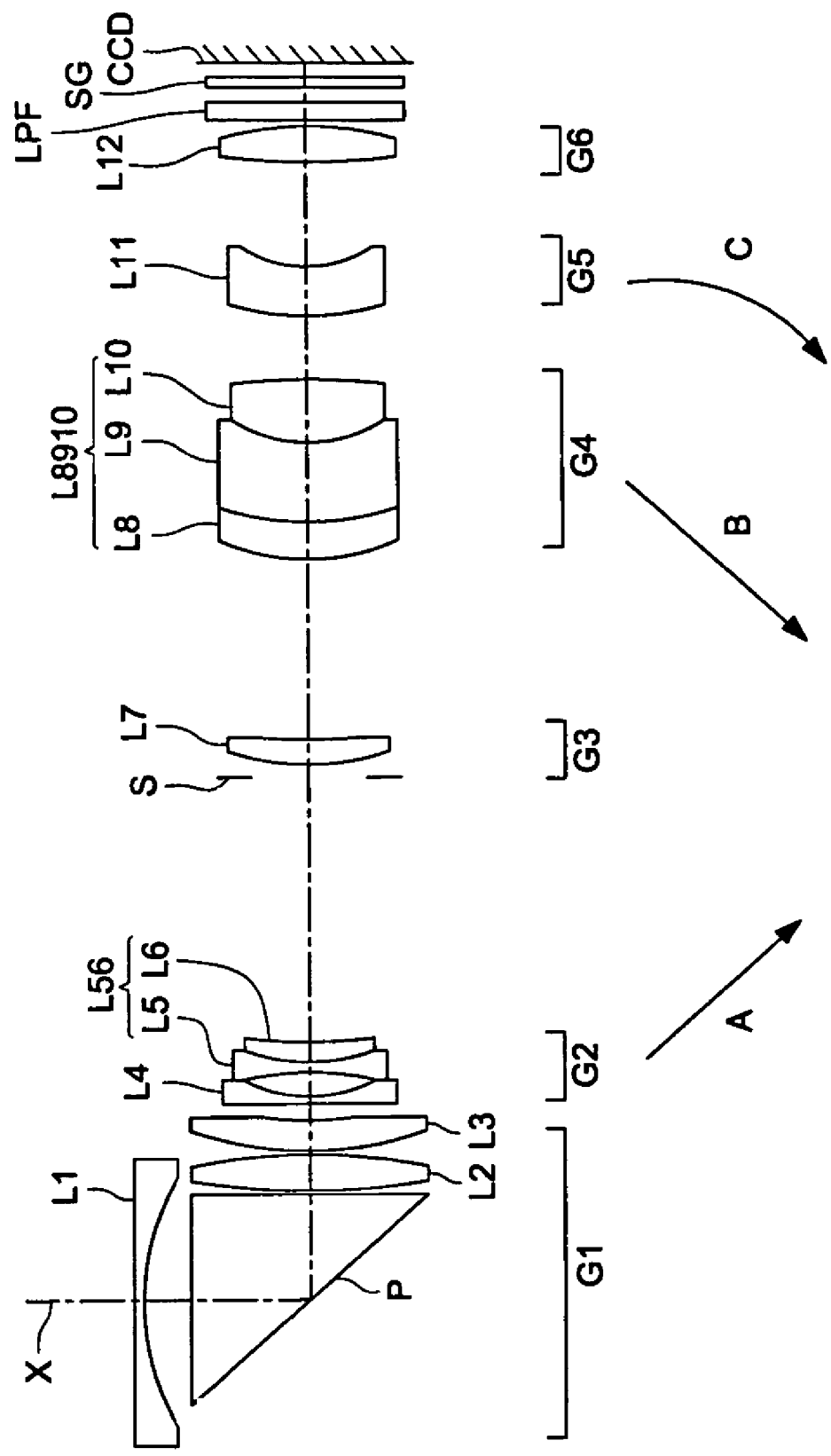
Figure 8:
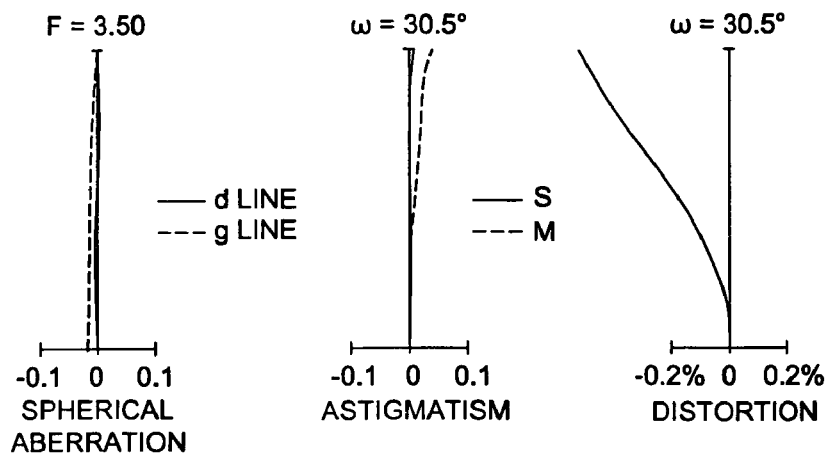
Figure 8:
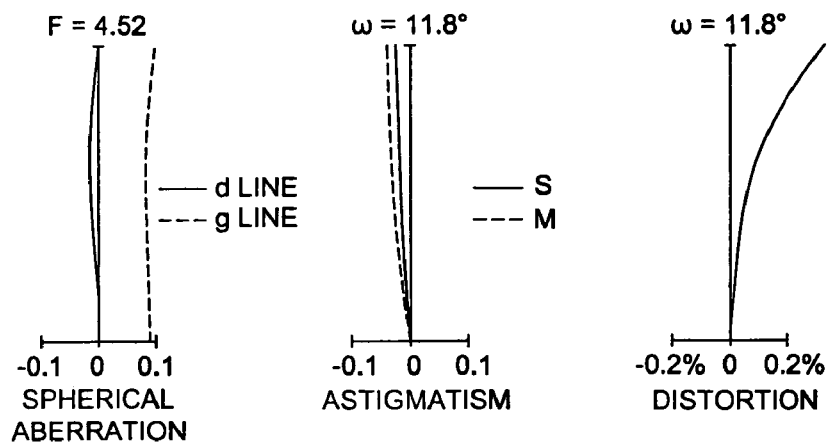
Figure 8:
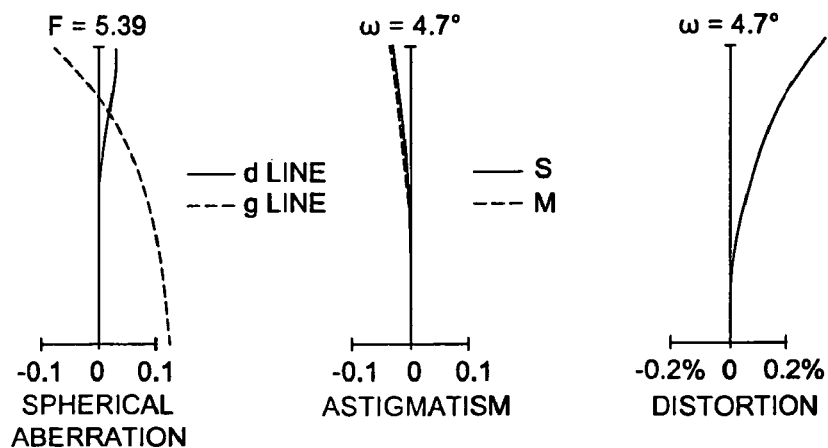
Figure 9:
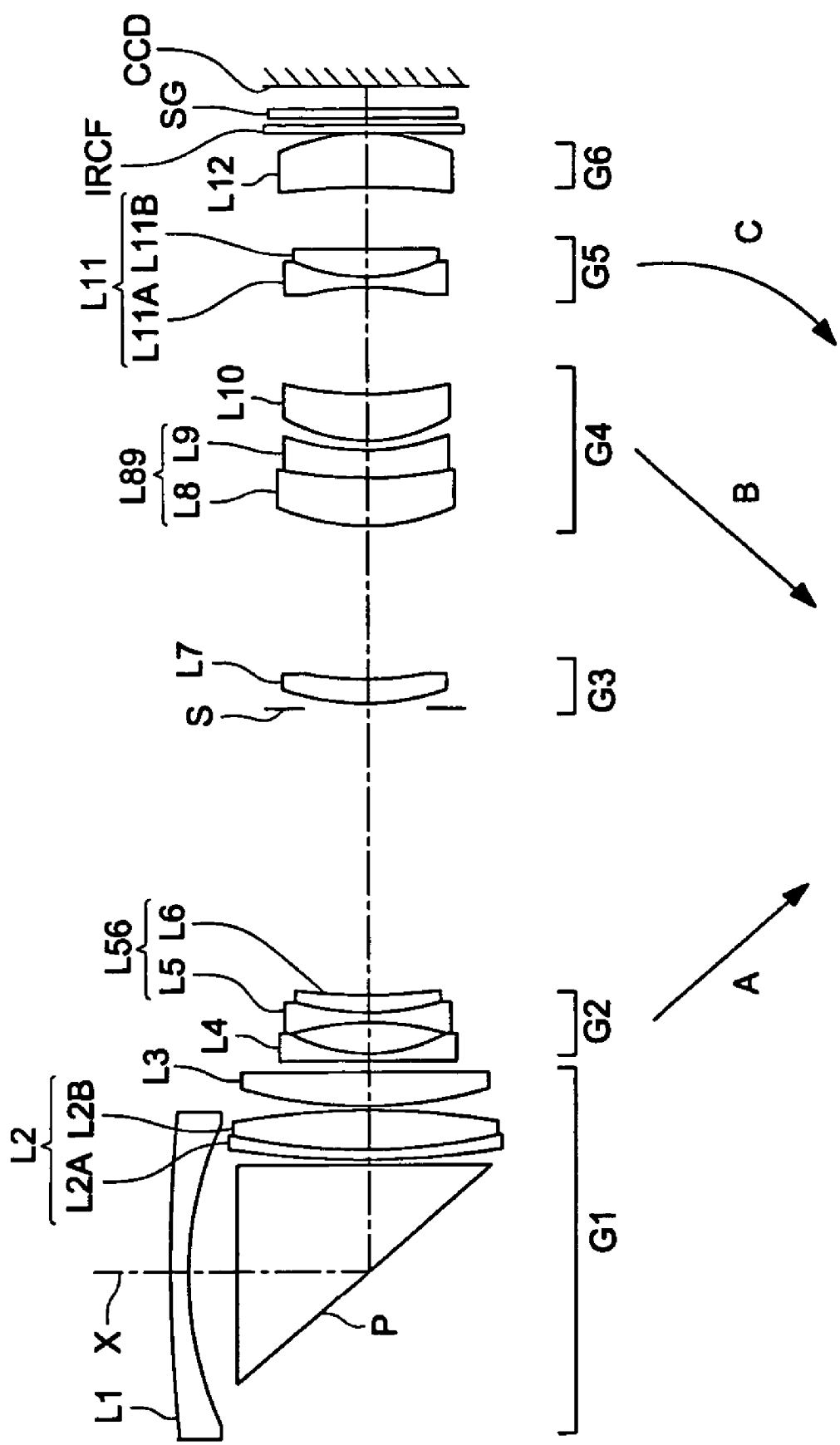

Each of FIGS. 4(A)-4(C) shows respectively aberration diagrams including spherical aberration, astigmatism and distortion of a zoom lens relating to Example 1;

FIG. 5 is a cross-sectional diagram of a zoom lens relating to Example 2;

Each of FIGS. 6(A)-6(C) shows respectively aberration diagrams including spherical aberration, astigmatism and distortion of a zoom lens relating to Example 2;

FIG. 7 is a cross-sectional diagram of a zoom lens relating to Example 3;

Each of FIGS. 8(A)-8(C) shows respectively aberration diagrams including spherical aberration, astigmatism and distortion of a zoom lens relating to Example 3;

FIG. 9 is a cross-sectional diagram of a zoom lens relating to Example 4; and

Figure 10:
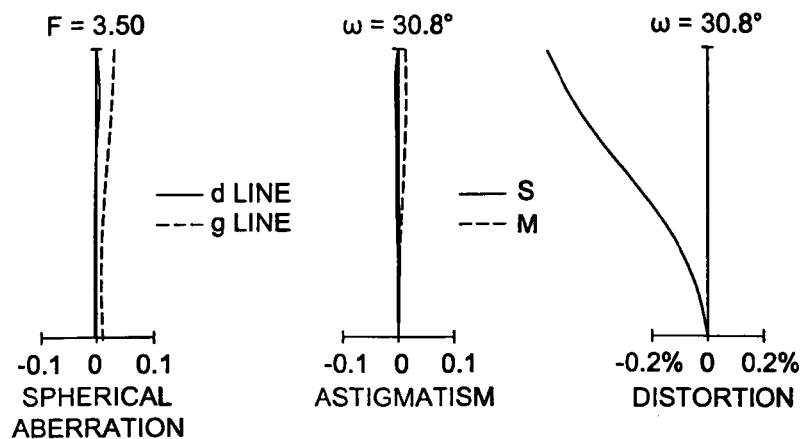
Figure 10:
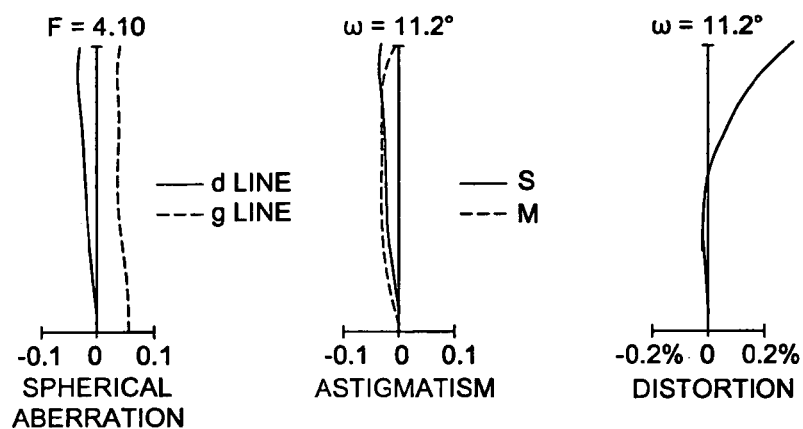
Figure 10:
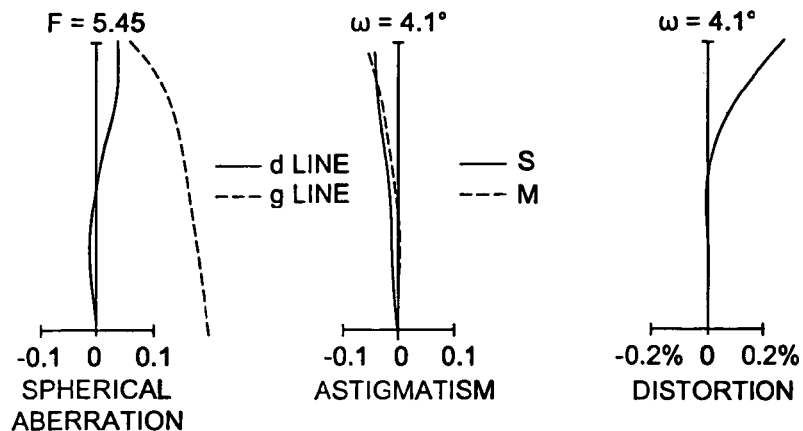

Each of FIGS. 10(A)-10(C) shows respectively aberration diagrams including spherical aberration, astigmatism and distortion of a zoom lens relating to Example 4.

DESCRIPTION OF THE PREFERRED EMBODIMENT

Preferred embodiments relating to the invention will be explained as follows.

Item 1 is a zoom lens for zooming by moving a plurality of lens groups including, in order from an object side thereof along an optical axis: a first lens group having a positive refractive power whose position on the optical axis is fixed during a zooming operation and a focusing operation; a second lens group having a negative refractive power; a third lens group having a positive refractive power; a fourth lens group having a positive refractive power; a fifth lens group having a negative refractive power; and a sixth lens group having a positive refractive power. The first lens group includes a reflection optical element for bending an optical path by reflecting a light flux, and at least the fifth lens group is used for focusing on an object at a finite distance. The zoom lens satisfies the following conditional expression:

$$0.05 < \frac{\beta_{MAX}}{\sqrt{f_W \times f_T}} < 0.14 \qquad (1)$$

where $\beta_{MAX}$ is a maximum lateral magnification of lens groups from a focusing lens group to an end lens group in the zoom lens under a condition that a focus of the zoom lens is adjusted to an object at infinity distance, between a wide-angle end and a telephoto end of the zoom lens, $f_W$ (mm) is a focal length of the zoom lens at the wide-angle end, and $f_T$ (mm) is a focal length of the zoom lens at the telephoto end.

The zoom lens described in Item 1 makes it possible to attain both higher zoom ratio and downsizing by arranging a first lens group that has positive refractive power, a second lens group having negative refractive power, a third lens group having positive refractive power, a fourth lens group having positive refractive power, a fifth lens group having negative refractive power and a sixth lens group having positive refractive power, in the order from the photographic object side along the optical axis.

Conditional expression (1) is one for properly setting the maximum lateral magnification value of lens groups from a focusing lens group to the end lens group of the zoom lens in the case that a focus of the zoom lens is adjusted to an object at infinity distance, among focal lengths between a wide-angle end and a telephoto end. When a lateral magnification of lens groups from the focusing lens group to the end lens group of the zoom lens grows greater, a fluctuation of a position of image point for an amount of movement of the focusing lens group along the optical axis grows greater. When the fluctuation of a position of image point for an amount of movement of the focusing lens group along the optical axis is greater, the focusing lens group needs to be moved accurately for accurate focusing operation, although there is a merit that focusing operation is possible with a small amount of movement. Depending on an actuator for moving a focusing lens group, slight movement is sometimes difficult, resulting in cost increase even if the slight movement is possible.

Therefore, by making a value of the conditional expression (1) to be lower than the upper limit value, it is possible to prevent that lateral magnification of lens groups from a focusing lens group to an end lens group in the zoom lens becomes too large and an amount of fluctuation of a position of an image point for an amount of movement of the focusing lens group along the optical axis becomes too large. Further, by making a value of the conditional expression (1) to be higher than the lower limit value, an amount of movement of the focusing lens group in focusing does not become too large, and it is not necessary to secure a large movement space for the focusing lens group, thus, downsizing of the total zoom lens can be attained. In addition, it is possible to maintain negative refractive power of the fifth lens group representing the focusing lens group properly, and Petzval's sum of the total zoom lens becomes small to make it possible to correct field curvature properly, and by strengthening telephoto effects by the fifth lens group having negative refractive power and by the sixth lens group having positive refractive power, it is possible to achieve downsizing of the total zoom lens. Incidentally, more preferable is satisfying of conditional expression (1').

$$0.06 < \frac{\beta_{MAX}}{\sqrt{f_W \times f_T}} < 0.13 \quad (1')$$

With respect to a measure of a small-sized zoom lens, downsizing at a level that satisfies the following expression is targeted in the constitution relating to the invention. By satisfying the condition shown in Expression (6), a total length of the zoom lens can be made short. By satisfying the condition shown in Expression (7), a thickness of a reflection optical element can be reduced. Therefore, a thickness of the image pickup apparatus in its thickness direction can be reduced, which makes it possible to achieve downsizing and weight reduction of the total image pickup apparatus;

$$L/V < 12.0 \quad (6)$$

$$\frac{PL}{\sqrt{f_W \times f_T}} < 0.80 \quad (7)$$

where L represents a distance from a lens surface closest to the object to a focal point on the image side of the zoom lens total system on the optical axis, V represents a zoom ratio (variable magnification ratio) from a wide-angle end to a telephoto end of the zoom lens, PL represents a thickness (mm) of the reflection optical element of the zoom lens, $f_W$ represents a focal length (mm) of the zoom lens at a wide-angle end and $f_T$ represents a focal length (mm) of the zoom lens at a telephoto end.

In this case, the focal point on the image side means an image point in the case where collimated light flux that is in parallel with an optical axis enters the zoom lens. Meanwhile, when parallel flat plates such as an optical low-pass filter, an infrared blocking filter and a seal glass of solid-state image sensor package are arranged between a surface of the zoom lens closest to the image and a position of a focal point on the image side, a value of the L is calculated under the condition that the parallel flat plates are made to be an air-conversion distance.

In the present specification, a focusing lens group means a group of lenses which travel on the optical axis for focusing on a photographic object at a finite distance. It is also possible to arrange so that the focusing lens group may compensate for a fluctuation of an image point position caused by a zooming operation.

In the present specification, a lateral magnification of lens groups from a focusing lens group to an end lens group in the zoom lens means a lateral magnification of lens groups composed of the focusing lens group and subsequent lens groups up to the end of the zoom lens.

Item 2 is the zoom lens described in Item 1 in which the position of the third lens group on the optical axis is fixed for a zooming operation and a focusing operation. Therefore, fixing the third lens group always in the zooming operation and the focusing operation, allows to simplify a lens drive mechanism of an image pickup apparatus including the zoom lens.

Item 3 is the zoom lens described in Item 1 or 2 in which the third lens group consists of: the third lens group consists of: one positive lens including at least one surface in an aspherical shape; and an aperture stop arranged at an object side or an image side of the positive lens along the optical axis.

By arranging an aperture stop to be close to the third lens group, and by constituting the third lens group with a single lens having an aspheric surface form on at least one surface thereof, it is possible to correct effectively spherical aberration, astigmatism and field curvature, while securing a space for movement of the second and fourth lens groups. Further, by arranging the aperture stop on the object side of the third lens group, it is possible to bring a position of entrance pupil to be close to the photographic object side on the optical axis, then, to make a diameter of the lens closest to the object side on the optical axis of the first lens group and a reflection optical element to be small, and thereby to make a thickness of the image pickup apparatus in its thickness direction to be small, which is further preferable.

Item 4 is the zoom lens described in any one of Items 1 to 3 in which the second lens group includes two negative lenses and one positive lens.

By constituting the second lens group with two negative lenses and one positive lens, it is possible to correct effectively off-axis chromatic aberration in all zoom range, and by making two negative lenses to take their shares for negative refractive power of the second lens group that becomes greater for higher zoom ratio, it is possible to correct various aberrations properly for the total system of the zoom lens, and to correct properly distortion and magnification chromatic aberration at wide-angle end, in particular.

Item 5 is the zoom lens described in any one of Items 1 to 4 in which the second lens group includes a positive lens satisfying following conditional expressions:

$$n_{2P} > 1.80 \text{ and} \qquad (2)$$

$$v_{2P} < 26.0, \qquad (3)$$

where $n_{2P}$ is a refractive index of the positive lens of the second lens group for d line, and $v_{2P}$ is an Abbe constant of the positive lens of the second lens group for d line.

Conditional expression (2) prescribes conditions for setting refractive index of the positive lens of the second lens group. Conditional expression (3) prescribes conditions for setting Abbe constant of the positive lens of the second lens group. Axial and off-axis chromatic aberrations for the entire zoom range can be corrected efficiently, when $n_{2P}$ is higher than the lower limit of the expression (2), and $v_{2P}$ is lower than the upper limit of the expression (3). Incidentally, the preferable is to satisfy the following conditional expressions.

$$n_{2P} > 1.85 \qquad (2')$$

$$v_{2P} < 23.0 \qquad (3')$$

Item 6 is the zoom lens described in any one of Items 1 to 5 in which the first lens group includes a positive lens satisfying a following conditional expression:

$$v_{1P} > 80, \qquad (4)$$

where $v_{1P}$ is an Abbe constant of the positive lens of the first lens group for d line.

In the zoom lens with higher zoom ratio as that in the present constitution, chromatic aberration is forced to grow greater, because a thick light flux passes through the positive lens in the first lens group at a telephoto end. In that case, it is possible to reduce chromatic aberration at a telephoto end, by using glass with abnormal dispersion of Abbe constant or specific low dispersion that satisfies conditional expression (4), for the positive lens in the first lens group.

Item 7 is the zoom lens described in any one of Items 1 to 6 in which each lens in the first lens group is a spherical lens.

In the zoom lens with higher zoom ratio as one in the present constitution, a diameter of the lens in the first lens group is large, and thereby, it is difficult to form a glass mold aspheric lens even when trying to use it, or there is a fear of cost increase. Further, performance degradation caused by errors in surface shapes is remarkable because a thick light flux passes through the lens in the first lens group at a telephoto end, and extremely high surface accuracy is required in the case of forming an aspheric lens. Therefore, by constituting the first lens group with spherical lenses entirely, it is possible to manufacture lenses through grinding processing in which surface accuracy may be relatively achieved, and the aforesaid problems can be overcome. In the meantime, by using two positive lenses in the first lens group, it is possible to make two positive lenses to share positive refractive power in the first lens group that grows greater in the case of higher zoom ratio, and thereby, to conduct excellent aberration correction without using an aspheric surface, which is preferable.

Item 8 is the zoom lens described in any one of Items 1 to 7 in which the fifth lens group consists of one plastic lens including at least one surface in an aspherical shape.

By causing the fifth lens group representing a moving lens group to have an aspheric surface shape, it is possible to correct effectively the curvature of field at a high angle of view and a fluctuation of distortion, in zooming operation and focusing operation. Further, by constituting with a single plastic lens, a load given to the drive mechanism can be reduced.

Item 9 is the zoom lens described in any one of Items 1 to 8 in which the fourth lens group consists of a cemented lens formed of three lenses being a positive lens, a negative lens, and a positive lens, in order from the object side of the zoom lens.

When the fourth lens group having the relatively strong image forming function among respective lens groups is formed of the so-called triplet type structure in which a positive lens, a negative lens, a positive lens are arranged in this order from the object side, spherical aberration, coma and the curvature of field can be corrected effectively. Further, by using two positive lenses, the positive refractive power can be shared, and occurrence of spherical aberration and the curvature of field can be controlled. Further, by making three lenses to be cemented lenses, the fourth lens group is constituted with only one cemented lens, whereby, each lens does not need to be adjusted in terms of position, resulting in easy manufacturing and higher productivity.

Item 10 is an image pickup apparatus including the zoom lens described in any one of Items 1 to 9. Therefore, it is provided for achieving both of high performance and downsizing.

While the preferred embodiments of the present invention have been described using specific terms, such description is for illustrative purposes only, and it is to be understood that changes and variations may be made without departing from the sprit or scope of the appended claims.

Though a prism is used as a reflection optical element having a function to bend an optical path by reflecting a light flux, in the example which will be stated later, the invention is not limited to this, and a mirror, for example, can also be used. By constituting the reflection optical element with a prism, a diameter of a light flux passing through a reflection optical system is small, thereby, the reflection optical element can be made small in size, and a thickness of the image pickup apparatus in the direction of the image pickup apparatus thickness can be made small. When a prism serves as the reflection optical element, it is preferable that a material satisfying the following conditional expression is used to constitute the prism:

$$ndp > 1.7 \qquad (5)$$

where ndp represents the refractive index of the prism for d line.

The conditional expression (5) is one that prescribes a range of the refractive index of a material of the prism. When ndp is higher than the lower limit of the expression, a diameter of the light flux passing through the prism is small, whereby, the prism can be made small in size and a thickness of the image pickup apparatus in its thickness direction can be made small.

Though the present constitution employs a design wherein an optical path is bent by 90° in the direction same as that of the long side of an image sensor, by a prism for bending an optical path, another design to bend an optical axis in the direction same as the short side of an image sensor may also be employed. In the case of bending the optical path in the direction of the short side, it is convenient for downsizing of a zoom lens because a size of the prism can be made small. In the case bending the optical path in the short side direction, images on the image surface are reversed on only a flip horizontal basis, while in the case bending the optical path in the long side direction, images on the image surface are reversed on only a flip vertical basis. In general, when CCD is used for a solid-state image sensor, bending an optical path in the short side direction occurs bend along the vertical line. Therefore, it requires frame memory or frame accumulation for obtaining a normal image. In the case of bending an optical path in the long side direction, the normal image is obtained by reversal reading by line accumulation or line memory, resulting in a merit that requirements for hardware for returning the image to the normal direction are less for the bend of an optical path in the long side direction. Incidentally, "the direction of the image pickup apparatus thickness" in the present specification means the direction identical to the optical axis of an incidence plane of the reflection optical element in the first lens group.

An image pickup lens used for an image pickup apparatus equipped with a solid-state image sensor is required to have telecentricity on the image side for obtaining excellent light-receiving sensitivity on the entire image plane. Telecentricity on the image side means that a principal ray enters an imaging area of a solid-state image sensor at an angle parallel with an optical axis at each image height. In recent years, it has become possible to correct a dissatisfaction amount of telecentricity on the image side, by arranging micro-lens array properly on an image-forming surface of the solid-state image sensor. Specifically, a pitch of arrangement of micro-lens arrays is established to be slightly smaller than a pixel pitch of each pixel on the imaging area. Accordingly, micro-lens array is arranged to be shifted more to the optical axis side of the imaging lens for each pixel as a location of the micro-lens array is closer to the peripheral portion of the image plane. Thereby, it is possible to guide a light flux entering obliquely efficiently to a light-receiving section of each pixel. In this case, for obtaining excellent light receiving sensitivity and image quality for the entire image plane, it is preferable that an incidence angle of a principal ray to the imaging area has linearity as far as possible for the image height.

In the constitution relating to the present invention, "a plastic lens" includes a lens made of ordinary plastic material, and a lens that is made of material wherein an ordinary plastic material is a base material, and small-sized particles are dispersed in the plastic material, and a volume ratio of plastic is 50% or more, and further, an occasion where coating processing is conducted on the surface of the aforesaid lens for the purpose of improvement of antireflection and surface strength is also included.

Lens L11 and lens L12 are plastic lens in Examples 1, 2 and 3 which will be described later, and lens L12 is a plastic lens in Example 4. However, there is a problem that an image point position for the total system of imaging lenses is fluctuated when ambient temperatures vary, because refractive index of the plastic lens material changes greatly when temperatures are changed. In the case of a zoom lens, a fluctuation of the image point position is commonly corrected by moving a focusing lens group in the optical axis direction, and therefore, an image point fluctuation itself in the temperature changes is not a problem. However, moving the focusing lens group may cause aberration deterioration such as chromatic aberration and field curvature. In such a case, it is possible to lighten a problem of temperature characteristics through refractive power sharing wherein a fluctuation of image point position in the case of temperature changes is canceled each other by negative lens L11 and positive lens L12, in Example 1 for example.

As of late, it has been discovered that performance change of a plastic material due to temperature can be made small by mixing inorganic fine particles in a plastic material. In detailed explanation, when fine particles are mixed in transparent plastic material in general, light scattering is caused and transmittance is lowered, whereby, it was difficult to use the plastic material as an optical material. However, it has become possible to prevent light scattering substantially, by making a size of fine particles to be smaller than a wavelength of transmitted light flux. Though the refractive index of a plastic material is lowered when a temperature rises, some inorganic particles show extremely small decline of refractive index caused by temperature rise compared with plastic, or some inorganic particles show the refractive index that rises when a temperature rises. It is therefore possible to lower a decline of the refractive index caused by temperature rise, by utilizing these temperature-dependencies. A change of refractive index can be made to hardly occur by operating to cancel each other. Specifically, by dispersing inorganic particles each having the maximum diameter of 20 nanometer or less in the plastic materials representing a base material, the plastic material becomes one having extremely low temperature-dependency for refractive index. For example, by dispersing fine particles of niobium oxide ($Nb_2O_5$) in acryl, a change in refractive index caused by temperature changes can be made small.

A change of refractive index caused by temperatures will be explained in detail. Refractive index change A caused by temperatures is expressed by the following expression by differentiating refractive index n by temperature t based on Lorentz-Lorenz equation;

$$A = \frac{(n^2+2)(n^2-1)}{6n}\left\{(-3\alpha) + \frac{1}{[R]}\frac{\partial [R]}{\partial t}\right\},$$

where $\alpha$ represents the coefficient of linear expansion and [R] represents molecular refraction.

In the case of a plastic material, contribution of the second term is small compared with that of the first term in the expression generally, and it can be ignored substantially. For example, in the case of PMMA resin, the coefficient of linear expansion $\alpha$ is $7\times10^{-5}$. When the coefficient is substituted in the expression above, $A=-1.2\times10^{-4}$ [/° C.] is obtained, and it substantially agrees with an actual measurement.

Specifically, it is preferable that the refractive index change A caused by temperatures which has been about $-1.2\times10^{-4}$ [/° C.] is controlled to be less than $8\times10^{-5}$ [/° C.] in terms of an absolute value. It is further preferable to control it to be less than $6\times10^{-5}$ [/° C.] in terms of an absolute value. Table 1 shows refractive index changes A (dn/dT) caused by temperatures for plastic materials which can be applied to the constitution relating to the invention.

TABLE 1

| Plastic material | A(Approximate value) $[10^{-5}/° C.]$ |
|---|---|
| Polyesters | −14 |
| Polyolefins | −12 |
| Polycarbonates | −14 |

Here, a difference between change amounts of back focus for temperature changes between an occasion where a plastic lens in which the aforesaid fine particles are dispersed is used and an occasion where the plastic lens is not used, by using the zoom lens in the following Example 1 as an example.

Table 2 shows various refractive indexes nd changed by temperatures. Further, Table 3 shows a change amount of back focus ($\Delta fB_W$, $\Delta fB_T$) at each of a wide angle-end and a telephoto end in the case of temperature rise by +30° C. from an ordinary temperature (20° C.) and a change amount of back focus ($\Delta fB_W$, $\Delta fB_T$) at each of a wide angle end and a telephoto end in the case of temperature fall by −30° C.

TABLE 2

| | A[/° C.] | Refractive index at ordinary temperature | Refractive index at (ordinary temperature +30° C.) | Refractive index at (ordinary temperature −30° C.) |
|---|---|---|---|---|
| Lens L1 | $-8 \times 10^{-5}$ | 1.6070 | 1.6046 | 1.6094 |
|  | $-6 \times 10^{-5}$ |  | 1.6052 | 1.6088 |
| Lens L2 | $-8 \times 10^{-5}$ | 1.5250 | 1.5226 | 1.5274 |
|  | $-6 \times 10^{-5}$ |  | 1.5232 | 1.5268 |

TABLE 3

| | +30° C. | | −30° C. | |
|---|---|---|---|---|
| A[/° C.] | $\Delta fB_W$ [mm] | $\Delta fB_T$ [mm] | $\Delta fB_W$ [mm] | $\Delta fB_T$ [mm] |
| $-8 \times 10^{-5}$ | −0.019 | −0.042 | +0.019 | +0.042 |
| $-6 \times 10^{-5}$ | −0.014 | −0.031 | +0.014 | +0.031 |

Here, Table 4 and Table 5 show the following values of a zoom lens system of the present example in the occasion where all plastic lenses are assumed to be those which do not contain the aforesaid particles for comparison: various refractive indexes nd changed by temperatures; a change amount of back focus ($\Delta fB_W$, $\Delta fB_T$) at each of a wide-angle end and a telephoto end in the case of temperature rise by +30° C. from an ordinary temperature (20° C.); and a change amount of back focus ($\Delta fB_W$, $\Delta fB_T$) at each of a wide angle end and a telephoto end in the case of temperature fall by −30° C.

TABLE 4

| | A[/° C.] | Refractive index at ordinary temperature | Refractive index at (ordinary temperature +30° C.) | Refractive index at (ordinary temperature −30° C.) |
|---|---|---|---|---|
| 11th lens | $-14 \times 10^{-5}$ | 1.6070 | 1.6027 | 1.6113 |
| 12th lens | $-12 \times 10^{-5}$ | 1.5250 | 1.5214 | 1.5286 |

TABLE 5

| +30° C. | | −30° C. | |
|---|---|---|---|
| $\Delta fB_W$ [mm] | $\Delta fB_T$ [mm] | $\Delta fB_W$ [mm] | $\Delta fB_T$ [mm] |
| −0.034 | −0.073 | +0.034 | +0.073 |

When comparing with an occasion where the aforesaid fine particles are not contained at all, the result of the foregoing shows that the change amount of back focus ($\Delta fB_T$) at a telephoto end due to temperature change is controlled to be a half or less, in an embodiment including lenses L11 and L12 formed of plastic material in which the aforesaid fine particles are dispersed and A=−6×10$^{-5}$ [/° C.] is satisfied.

It is further possible that each of lens L11 and lens L12 is formed of a plastic material in which the particles having a different value of a refractive index change A caused by temperatures are dispersed. In that case, it is possible to prevent occurrence of a fluctuation of image point positions in the case of temperature changes in the total imaging lens, by selecting an optimum value of A, considering an extent of contribution to a fluctuation of image point positions in the case of temperature changes in each lens.

The invention provides a small-sized zoom lens that can be preferably used for a digital camera and a video camera employing a solid-state image sensor having a high number of pixels, and has a high image-forming function and a zoom ratio of about 7× through 8×.

Figure 1:
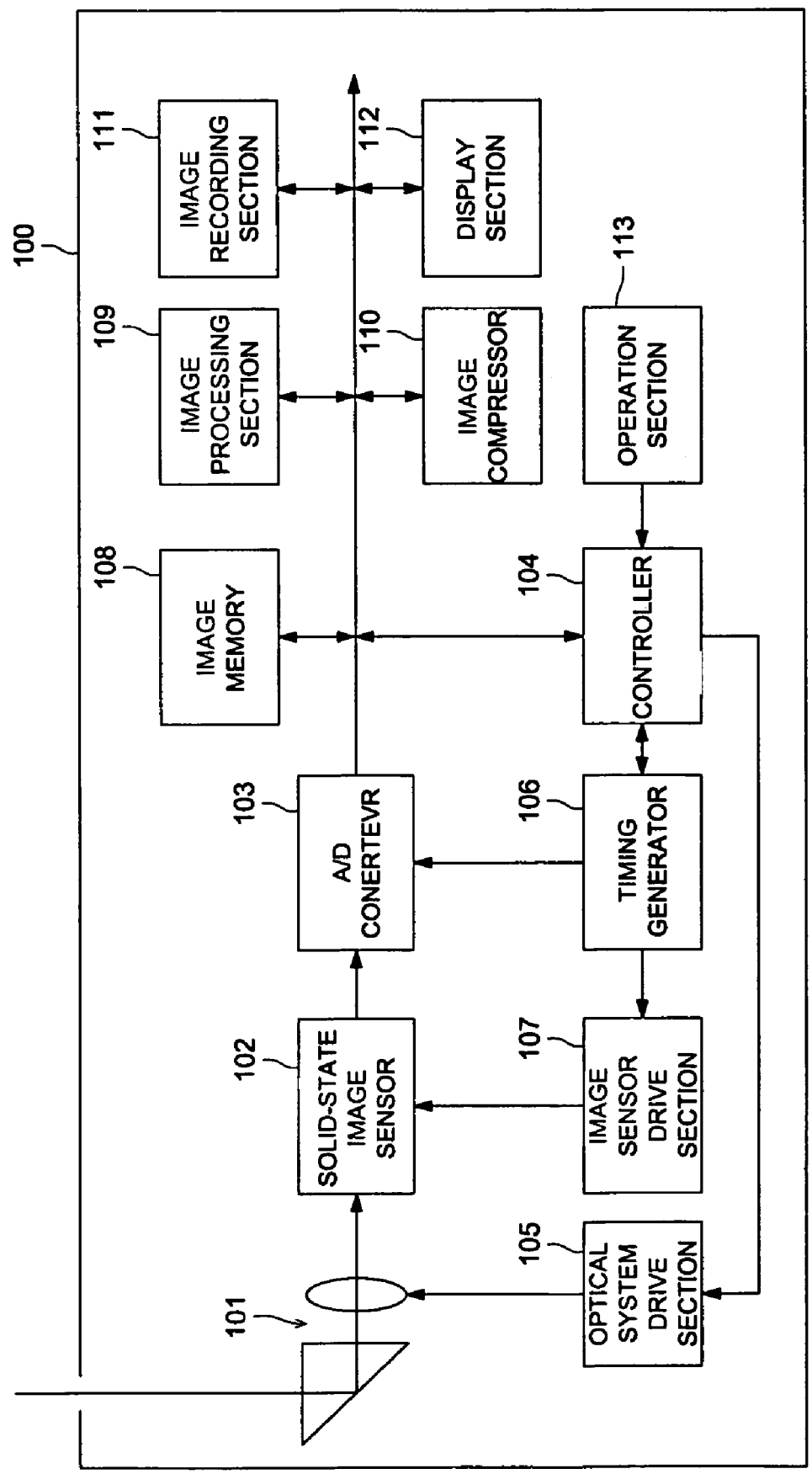
FIG. 1 is a block diagram of image pickup apparatus 100.
Figure 2:
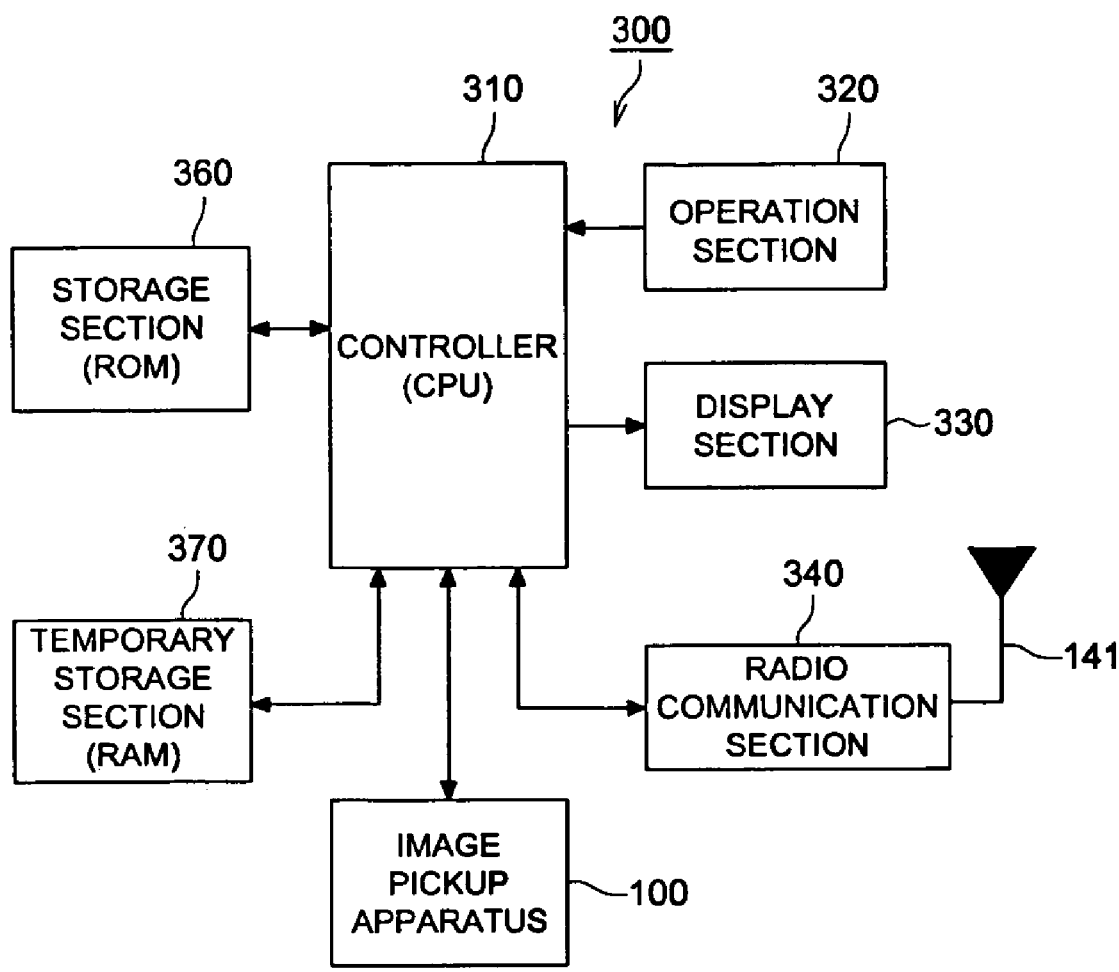
FIG. 2 is a block diagram showing the internal structure of cell-phone 300.

With reference to FIGS. 1 and 2, image pickup apparatus 100 carrying a zoom lens of the embodiment relating to the invention will be explained as follows. FIG. 1 is a block diagram of the image pickup apparatus 100.

As shown in FIG. 1, image pickup apparatus 100 is provided with zoom lens 101, solid-state image sensor 102, A/D converter 103, controller 104, optical system drive section 105, timing generating section 106, image sensor drive section 107, image memory 108, image processing section 109, image compression section 110, image recording section 111, display section 112 and operation section 113.

Zoom lens 101 has a function to form an image of a photographic object on an imaging area of solid-state image sensor 102. The solid-state image sensor 102 is an image sensor such as CCD and CMOS, and it converts an incident light photoelectrically for each of R, G and B, to output their analog signals. The A/D converter 103 converts analog signals into digital image data.

The controller 104 controls respective portions of image pickup apparatus 100. The controller 104 includes CPU (Central Processing Unit), RAM (Random Access Memory) and ROM (Read Only Memory), and various programs which have been read and developed on RAM and CPU conduct various processing jointly.

The optical system drive section 105 drives and controls zoom lens 101 through controls of the controller 104, in a zooming operation, a focusing operation (movement of the second lens group G2, the fourth lens group G4 and fifth lens group G5 which will be explained later) and exposure. The timing generating section 106 outputs timing signals for outputting analog signal. The image sensor drive section 107 drives and controls solid-state image sensor 102 for scanning.

The image memory 108 stores image data so that they may be read and written. The image processing section 109 applys various image processing to image data. The image compression section 110 compresses image data for imaging through a compression method such as JPEG (Joint Photographic Experts Group). The image recording section 111 records image data on a recording medium such as a memory card that is set on an unillustrated slot.

The display section 112 is a color liquid crystal panel, and it displays image data after photographing, through images before photographing, and various types of display for operation. The operation section 113 includes a release button, various types of modes and various types of keys for setting values, and it outputs information inputted by a user to the controller 104.

Operations in the image pickup apparatus 100 will be explained as follows. The image pickup apparatus 100 monitors the photographic object (displays through images) and conducts image pickup for photographing of a photographic object, when the photographic object is photographed. In the monitoring operation, an image of a photographic object obtained through zoom lens 101 is formed on a light-receiving surface of solid-state image sensor 102. Timing generating section 106 and image sensor drive section 107 drive and scan solid-state image sensor 102 arranged behind the optical axis for photographing of zoom lens 101, to output analog signal for each fixed cycle as output through photoelectric conversion, which is equivalent to one image frame.

The analog signal is converted into digital data at A/D converter 103, after they are adjusted in terms of gain for each original color component of RGB. The image processing section 109 applies color processing including pixel interpolating processing and $\gamma$ correction processing to the digital data, and generates luminance signal Y and color difference signals Cb and Cr (image data) to be stored in image memory 108. The stored signals are read periodically and their video signal is generated to be outputted to display section 112.

The display section 112 functions as an electronic finder for the monitoring operation, and it displays picked up images on a real time basis. Under this condition, optical system drive section 105 drives zoom lens 101 based on user's operation input through operation section 113 as occasion demands to establish zooming operation, focusing operation and exposure.

The image pickup apparatus 100 conducts image pickup of still image data when operator operates a release button of operation section 113 at timing of photographing the still image under the monitoring operation as in the foregoing. A frame of image data stored in image memory 108 are extracted in accordance with operations of the release button, and are compressed by image compression section 110. The compressed image data are recorded on a recording medium by image recording section 111.

Incidentally, the descriptions in each embodiment and each example mentioned above represent an example of a preferable zoom lens and an example of an image pickup apparatus relating to the invention, and the invention is not limited to these examples.

For example, although an example of a digital still camera was explained as an image pickup apparatus carrying a zoom lens, in the aforesaid embodiment and example, the invention is not limited to this, and an equipment such as a portable terminal having at least an image pickup function such as a video camera, a cell-phone with an image pickup function, PHS (Personal Handyphone System) and PDA (Personal Digital Assistant) may also be used as an image pickup apparatus carrying a zoom lens.

Further, an image pickup apparatus carrying a zoom lens may also serve as an image pickup unit housed in the aforesaid equipment. An example of cell-phone 300 carrying image pickup apparatus 100 will be explained with reference to FIG. 2 which is a block diagram showing an internal constitution of the cell-phone 300.

As shown in FIG. 2, the cell-phone 300 is equipped with controller (CPU) 310 that controls each section on an all-inclusive basis and executes programs corresponding to various processing; operation section 320 for inputting numbers by operating keys; display section 330 that displays picked-up images in addition to prescribed data; radio communication section 340 for realizing of various types of information communication between itself and outer servers through antenna 341; image pickup apparatus 100; memory section (ROM) 360 which stores therein necessary respective data such as system programs of cell-phone 300, various types of processing programs and terminal ID; and temporary memory section (RAM) 370 used as a work area to store temporarily various types of processing programs executed by the controller 310 and data, or processing data, or data imaged by image pickup apparatus 100.

Meanwhile, controller 104 of image pickup apparatus 100 and controller 310 of cell-phone 300 are connected to each other to be capable of communicating, and in this case, functions of display section 112 and operating section 113 shown in FIG. 1 can be moved to the cell-phone 300 side, in which, however, operations of the image pickup apparatus 100 remains unchanged basically. More specifically, an external connection terminal (not shown) of the image pickup apparatus 100 is connected to controller 310 of cell-phone 300, thus, release signal is transmitted to the image pickup apparatus 100 from the cell-phone 300, and image signal such as luminance signal and color difference signal obtained through imaging are outputted to the controller 310 from the image pickup apparatus 100. Control system of cell-phone 300 stores the outputted image signal in memory section 360, or displays the outputted image signal on display section 330, or further transmit the outputted image signal to the outside as image information through radio communication section 340.

Further, the image pickup apparatus carrying a zoom lens may also be constituted as a camera module including a controller and an image processing section arranged on a board, and further including the zoom lens, and the camera module may also be provided on the assumption to be used by connecting to a separate object having a display section and an operation section through a connector.

An example of a zoom lens that can be used for image pickup apparatus 100 shown in FIG. 1 will be shown as follows, to which, however, the invention is not limited. Symbols used for each example are as follows.

f: Focal length of a total zoom lens system r: Radius of curvature d: Axial distance between surfaces nd: Refractive index of lens material for d line vd: Abbe constant of lens material A form of an aspheric surface in each example is expressed by the following expression under the assumption that the vertex of the surface is the origin, X-axis is in the direction of an optical axis, and h represents a height in the direction perpendicular to the optical axis;

$$X = \frac{h^2/r}{1 + \sqrt{1-(1+K)h^2/r^2}} + \sum A_i h^i$$

where Ai represents $i^{th}$ order aspheric surface coefficient, r represents a radius of curvature and K represents the conic constant.

Incidentally, it is assumed that exponent for 10 (for example, $2.5 \times 10^{-02}$) is expressed by E (for example, 2.5E–02), hereafter (including lens data on the Tables).

EXAMPLES

Example 1

Specifications:
 Focal length: f=6.49 mm–14.46 mm–43.16 mm
 Field angle: 2ω=60.6°–27.2°–9.2°

Figure 3:
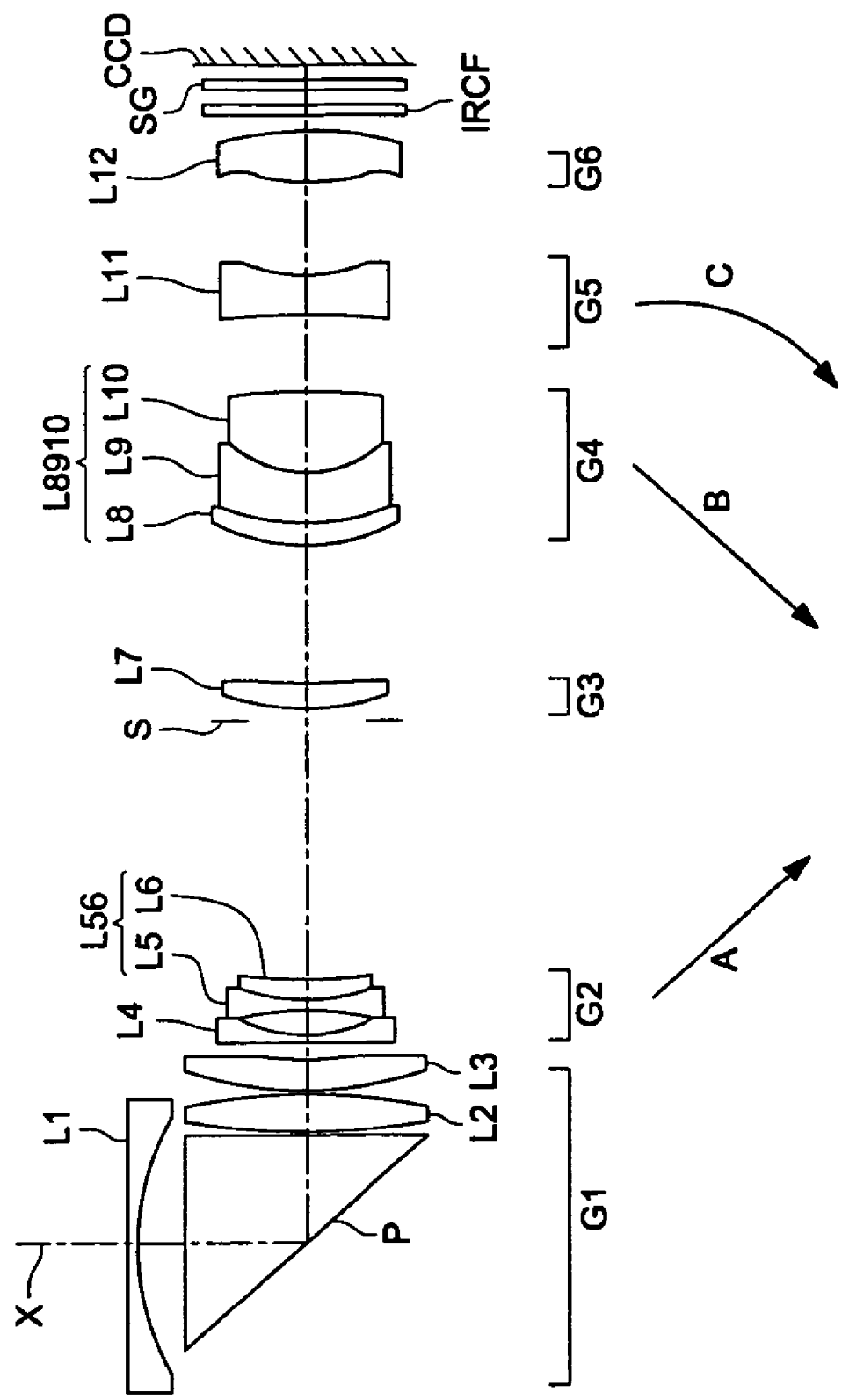
FIG. 3 is a cross-sectional diagram of a zoom lens relating to Example 1.

Table 6 shows lens data of a zoom lens relating to Example 1. FIG. 3 shows a cross-sectional view of a zoom lens relating to Example 1, and FIGS. 4(A) to 4(C) show aberration diagrams of spherical aberration, astigmatism and distortion of a zoom lens relating to Example 1. In this case, FIG. 4(A) shows the aberration diagrams for focal length 6.49 mm, FIG. 4(B) shows the aberration diagrams for focal length 14.46 mm and FIG. 4(C) shows the aberration diagrams for focal length 43.16 mm. In the meantime, in the following aberration diagrams, a solid line corresponds to d line and dotted line corresponds to g line in the spherical aberration diagram and a solid line corresponds to a saggital image surface and a dotted line corresponds to a meridional image surface image surface.

TABLE 6

Example 1

(a)

| i | ri | di | ndi | vdi |
|---|---|---|---|---|
| 1 | 110.700 | 0.60 | 1.84666 | 23.8 |
| 2 | 18.216 | 2.10 | | |
| 3 | ∞ | 5.80 | 1.90366 | 31.3 |
| 4 | ∞ | 5.80 | | |
| 5 | ∞ | 0.20 | | |
| 6 | 44.729 | 1.88 | 1.49700 | 81.6 |
| 7 | −25.550 | 0.20 | | |
| 8 | 17.973 | 1.71 | 1.72916 | 54.7 |
| 9 | 251.466 | Variable | | |
| 10 | −116.000 | 0.50 | 1.78590 | 44.2 |
| 11 | 8.029 | 1.24 | | |
| 12 | −14.600 | 0.50 | 1.72916 | 54.7 |
| 13 | 8.960 | 1.15 | 1.92286 | 20.9 |
| 14 | 63.080 | Variable | | |
| 15 | ∞ | 0.60 | | |
| 16 | 11.300 | 1.40 | 1.58313 | 59.4 |
| 17 | 64.361 | Variable | | |
| 18 | 9.070 | 1.23 | 1.48749 | 70.2 |
| 19 | 12.915 | 2.72 | 1.84666 | 23.8 |
| 20 | 6.168 | 4.00 | 1.58913 | 61.2 |
| 21 | −32.892 | Variable | | |
| 22 | −98.928 | 2.50 | 1.60700 | 27.0 |
| 23 | 11.552 | Variable | | |
| 24 | 15.315 | 2.50 | 1.52500 | 56.0 |
| 25 | −31.240 | 0.70 | | |
| 26 | ∞ | 0.50 | 1.51633 | 64.1 |
| 27 | ∞ | 0.90 | | |
| 28 | ∞ | 0.50 | 1.51633 | 64.1 |
| 29 | ∞ | | | |

TABLE 6-continued

Example 1

(b) Aspheric surface coefficients $16^{th}$ surface

K = 0.0
A4 = −1.0151E−04
A6 = 2.9427E−07
A8 = −6.1442E−08
A10 = 3.5164E−09

$21^{st}$ surface

K = 0.0
A4 = 3.9845E−04
A6 = 6.5552E−07
A8 = −1.0875E−07
A10 = 1.5572E−08

$22^{nd}$ surface

K = 0.0
A4 = −1.7899E−04
A6 = −2.6901E−05
A8 = 1.9058E−06
A10 = 4.5581E−08

$23^{rd}$ surface

K = 0.0
A4 = −2.7435E−04
A6 = −1.0766E−05
A8 = 4.4548E−07
A10 = 1.3810E−07

$24^{th}$ surface

K = 0.0
A4 = −1.2055E−03
A6 = 7.8733E−05
A8 = −6.4510E−06
A10 = 2.6289E−07
A12 = −8.6908E−09

$25^{th}$ surface

K = 0.0
A4 = −1.9168E−03
A6 = 1.4866E−04
A8 = −6.6183E−06
A10 = 6.0755E−09
A12 = 1.5276E−09

(c)

| Focal length f | d9 | d14 | d17 | d21 | d23 |
|---|---|---|---|---|---|
| 6.49 | 0.70 | 13.72 | 7.32 | 3.72 | 4.92 |
| 14.46 | 6.86 | 7.56 | 4.06 | 6.33 | 5.58 |
| 43.16 | 13.02 | 1.40 | 0.80 | 4.99 | 10.17 |

The zoom lens in Example 1 is provided with first lens group G1 having positive refractive power, second lens group G2 having negative refractive power, aperture stop S (which is sometimes included in the third lens group), third lens group G3 having positive refractive power, fourth lens group G4 having positive refractive power, fifth lens group G5 having negative refractive power and sixth lens group G6 having positive refractive power, in this order form the object side of the zoom lens along the optical axis. In a zooming operation from a wide-angle end to a telephoto end, the first lens group G1, the third lens group G3, the sixth lens group G6 and the aperture stop S are not changed in terms of a position on the optical axis, while, the second lens group G2 moves monotonously to expand a distance between the first lens group G1 and the second lens group G2 as shown by arrow A, the fourth lens group G4 moves monotonously to expand a distance between the third lens group G3 and the fourth lens group G4 as shown by arrow B and the fifth lens group G5 moves non-linearly to expand a distance between the fifth lens group G5 and the sixth lens group G6 as shown by arrow C, thus, each distance between lens groups is changed to zoom. In a focusing operation, at least the fifth lens group G5 moves to the image side of the zoom lens along the optical axis. By moving only the fifth lens group G5 for the focusing operation, it is possible to control the movement for focusing without complicating the mechanism for moving the fifth lens group G5. Incidentally, the fifth lens group and the fourth lens group may also moves as one body for focusing operation, in addition to moving the fifth lens group G5 alone for focusing operation. By doing this, a fluctuation of image point position for an amount of movement of focusing lens group in the optical axis direction can further be made small. In addition, it is not necessary that an amount of movement of the fourth lens group and that of the fifth lens group are exactly the same mutually. The fourth and fifth lens groups may moves based on an optimum amount of movement for each of the fourth and fifth lens groups determined by considering aberration performance in focusing operation for a photographic object in a short distance. Further, by arranging a mechanical shutter to be close to an aperture stop whose position on the optical axis is unchangeable, in zooming operation from a wide-angle end to a telephoto end, a mechanism for moving this mechanical shutter becomes useless, thus, a thickness of the image pickup apparatus in its thickness direction can be reduced. Further, in the present example (the same applies also to the following examples), the second lens group G2 and the fourth lens group G4 are moved completely linearly in the zooming operation from a wide-angle end to a telephoto end. By doing this, a single actuator can move the second lens group G2 and the fourth lens group G4 simultaneously, whereby, a lens drive mechanism of an image pickup apparatus carrying a zoom lens can be simplified.

The first lens group G1 is provided with negative lens L1, prism P representing a reflection optical element having a function to bend an optical path by reflecting a light flux, positive lens L2 and positive lens L3 (each of lenses L1-L3 is a spherical lens). The second lens group G2 is provided with negative lens L4 and cemented lens L56 in which negative lens L5 and positive lens L6 are cemented. The third lens group G3 is composed only of positive glass mold lens L7 having an aspheric surface form on the object side. The fourth lens group G4 is composed only of cemented lens L8910 in which three lenses of: positive lens L8, negative lens L9 and positive glass mold lens L10 having an aspheric surface form on the object side are cemented. The fifth lens group G5 is composed only of negative plastic lens L11 having aspheric surface forms on its both sides, and the sixth lens group G6 is composed only of positive plastic lens L12 having aspheric surface forms on its both sides. Infrared blocking filter IRCF wherein infrared blocking coating is provided on an optical surface and seal glass SG covering an imaging surface of solid-state image sensor CCD are arranged between the sixth lens group G6 and the imaging surface of the solid-state image sensor CCD. Incidentally, though the aspheric surface is arranged to be at the aforesaid position in the present example, the invention is not limited to this.

Example 2

Specifications:
  Focal length: f=6.49 mm–16.74 mm–43.16 mm
  Field angle: 2ω=60.7°–23.6°–9.2°

Table 7 shows lens data of a zoom lens relating to Example 2. FIG. 5 shows a cross-sectional view of a zoom lens relating to Example 2, and FIGS. 6(A) to 6(C) show aberration diagrams of spherical aberration, astigmatism and distortion of a zoom lens relating to Example 2. In this case, FIG. 6(A) shows aberration diagrams for focal length 6.49 mm, FIG. 6(B) shows aberration diagrams for focal length 16.74 mm and FIG. 6(C) shows aberration diagrams for focal length 43.16 mm.

TABLE 7

Example 2

(a)

| i | ri | di | ndi | vdi |
|---|----|----|-----|-----|
| 1 | 79.192 | 0.60 | 1.84666 | 23.8 |
| 2 | 17.666 | 2.10 | | |
| 3 | ∞ | 5.80 | 1.90366 | 31.3 |
| 4 | ∞ | 5.80 | | |
| 5 | ∞ | 0.20 | | |
| 6 | 50.126 | 1.72 | 1.49700 | 81.6 |
| 7 | −30.903 | 0.20 | | |
| 8 | 18.008 | 1.82 | 1.69680 | 55.5 |
| 9 | −574.171 | Variable | | |
| 10 | −105.658 | 0.50 | 1.77250 | 49.6 |
| 11 | 8.597 | 1.20 | | |
| 12 | −16.440 | 0.50 | 1.72916 | 54.7 |
| 13 | 9.343 | 1.10 | 1.92286 | 20.9 |
| 14 | 39.539 | Variable | | |
| 15 | ∞ | 0.60 | | |
| 16 | 12.607 | 1.40 | 1.58313 | 59.4 |
| 17 | 132.824 | Variable | | |
| 18 | 9.534 | 1.23 | 1.48749 | 70.2 |
| 19 | 13.880 | 1.38 | 1.84666 | 23.8 |
| 20 | 7.774 | 4.00 | 1.58913 | 61.2 |
| 21 | −16.782 | Variable | | |
| 22 | −17.839 | 1.70 | 1.60700 | 27.0 |
| 23 | 13.756 | Variable | | |
| 24 | 15.420 | 2.24 | 1.52500 | 56.0 |
| 25 | −35.682 | 0.70 | | |
| 26 | ∞ | 0.50 | 1.51633 | 64.1 |
| 27 | ∞ | 0.90 | | |
| 28 | ∞ | 0.50 | 1.51633 | 64.1 |
| 29 | ∞ | | | |

(b) Aspheric surface coefficient

16$^{th}$ surface

K = 0.0
A4 = −9.6981E−05
A6 = 1.5209E−06
A8 = −2.0689E−07
A10 = 9.8000E−09

21$^{st}$ surface

K = 0.0
A4 = 4.1215E−04
A6 = −4.9572E−06
A8 = 2.5818E−07
A10 = −2.2441E−09

22$^{nd}$ surface

K = 0.0
A4 = 2.1364E−05
A6 = −4.9525E−06
A8 = 4.1272E−06
A10 = −1.2494E−07

23$^{rd}$ surface

K = 0.0
A4 = −2.8544E−04
A6 = 3.5954E−05
A8 = 2.2290E−06
A10 = −1.0025E−08

24$^{th}$ surface

K = 0.0
A4 = −2.1388E−03

TABLE 7-continued

Example 2

A6 = 4.2270E−05
A8 = −2.3307E−06
A10 = 1.5075E−07
A12 = −9.3269E−09
25$^{th}$ surface K = 0.0
A4 = −3.0348E−03
A6 = 1.2813E−04
A8 = −2.7251E−06
A10 = −1.0162E−07
A12 = 1.5913E−09

(c)

| Focal length f | d9 | d14 | d17 | d21 | d23 |
|---|---|---|---|---|---|
| 6.49 | 0.54 | 14.04 | 7.92 | 3.39 | 4.82 |
| 16.74 | 7.85 | 6.73 | 4.01 | 5.04 | 9.09 |
| 43.16 | 13.18 | 1.40 | 0.70 | 4.83 | 12.61 |

The zoom lens in Example 2 is provided with first lens group G1 having positive refractive power, second lens group G2 having negative refractive power, aperture stop S (which is sometimes included in the third lens group), third lens group G3 having positive refractive power, fourth lens group G4 having positive refractive power, fifth lens group G5 having negative refractive power and sixth lens group G6 having positive refractive power, in this order from the object side along the optical axis. In the a zooming operation from a wide-angle end to a telephoto end, the first lens group G1, the third lens group G3, the sixth lens group G6 and the aperture stop S are not changed in terms of a position on the optical axis, while, the second lens group G2 moves monotonously to expand a distance between the first lens group G1 and the second lens group G2 as shown by arrow A, the fourth lens group G4 moves monotonously to expand a distance between the third lens group G3 and the fourth lens group G4 as shown by arrow B and the fifth lens group G5 moves non-linearly to expand a distance between the fifth lens group G5 and the sixth lens group G6 as shown by arrow C, thus, each distance between lens groups is changed to zoom. The others of the lens groups are fixed in the zooming operation. In a focusing operation, at least the fifth lens group G5 moves to the image side along the optical axis. By moving only the fifth lens group G5 for the focusing operation, it is possible to control the movement for focusing without complicating the mechanism for moving the fifth lens group G5. Incidentally, the fifth lens group and the fourth lens group may also moves as one body for focusing operation, in addition to moving the fifth lens group G5 alone for focusing operation. By doing this, a fluctuation of image point position for an amount of movement of focusing lens group in the optical axis direction can further be made small. In addition, it is not necessary that an amount of movement of the fourth lens group and that of the fifth lens group are exactly the same mutually. The fourth and fifth lens groups may moves based on an optimum amount of movement for each of the fourth and fifth lens groups determined by considering aberration performance in focusing operation for a photographic object in a short distance. Further, by arranging a mechanical shutter to be close to an aperture stop whose position on the optical axis is unchangeable, in the zooming operation from a wide-angle end to a telephoto end, a mechanism for moving this mechanical shutter becomes useless, thus, a thickness of the image pickup apparatus in its thickness direction can be reduced.

The first lens group G1 is provided with negative lens L1, prism P representing a reflection optical element having a function to bend an optical path by reflecting a light flux, positive lens L2 and positive lens L3 (each of lenses L1-L3 is a spherical lens). The second lens group G2 is provided with negative lens L4 and cemented lens L56 in which negative lens L5 and positive lens L6 are cemented. The third lens group G3 is composed only of positive glass mold lens L7 having an aspheric surface form on the object side. The fourth lens group G4 is composed only of cemented lens L8910 in which three lenses of: positive lens L8, negative lens L9 and positive glass mold lens L10 having an aspheric surface form on the object side are cemented. The fifth lens group G5 is composed only of negative plastic lens L11 having aspheric surface forms on its both sides, and the sixth lens group G6 is composed only of positive plastic lens L12 having aspheric surface forms on its both sides. Infrared blocking filter IRCF wherein infrared blocking coating is provided on an optical surface and seal glass SG covering an imaging surface of solid-state image sensor CCD are arranged between the sixth lens group G6 and the imaging surface of the solid-state image sensor CCD. Incidentally, though the aspheric surface is arranged to be at the aforesaid position in the present example, the invention is not limited to this.

Example 3

Specifications:
  Focal length: f=6.45 mm–16.65 mm–42.85 mm
  Field angle: 2ω=61.0°–23.6°–9.3°

Table 8 shows lens data of a zoom lens relating to Example 3. FIG. 7 shows a cross-sectional view of a zoom lens relating to Example 3, and FIGS. 8(A) to 8(C) show aberration diagrams of spherical aberration, astigmatism and distortion of a zoom lens relating to Example 3. In this case, FIG. 8(A) shows aberration diagrams for focal length 6.45 mm, FIG. 8(B) shows aberration diagrams for focal length 16.65 mm and FIG. 8(C) shows aberration diagrams for focal length 42.85 mm.

TABLE 8

Example 3

(a)

| i | ri | di | ndi | vdi |
|---|---|---|---|---|
| 1 | 136.358 | 0.60 | 1.80518 | 25.4 |
| 2 | 17.288 | 1.99 | | |
| 3 | ∞ | 5.95 | 1.90366 | 31.3 |
| 4 | ∞ | 5.95 | | |
| 5 | ∞ | 0.20 | | |
| 6 | 51.247 | 1.76 | 1.49700 | 81.6 |
| 7 | −31.347 | 0.20 | | |
| 8 | 23.375 | 1.80 | 1.72916 | 54.7 |
| 9 | −86.024 | Variable | | |
| 10 | −103.634 | 0.55 | 1.88300 | 40.8 |
| 11 | 10.078 | 1.23 | | |
| 12 | −13.884 | 0.50 | 1.77250 | 49.6 |
| 13 | 11.051 | 1.34 | 1.92286 | 20.9 |
| 14 | −141.827 | Variable | | |
| 15 | ∞ | 0.60 | | |
| 16 | 14.288 | 1.46 | 1.58913 | 61.2 |
| 17 | 90.267 | Variable | | |
| 18 | 9.628 | 2.07 | 1.49700 | 81.6 |
| 19 | 17.875 | 4.34 | 1.84666 | 23.8 |
| 20 | 6.900 | 3.36 | 1.58313 | 59.4 |

TABLE 8-continued

Example 3

| | | | | |
|---|---|---|---|---|
| 21 | −46.849 | Variable | | |
| 22 | 9.992 | 2.72 | 1.60700 | 27.0 |
| 23 | 5.733 | Variable | | |
| 24 | 17.694 | 1.79 | 1.53180 | 56.0 |
| 25 | −35.100 | 0.20 | | |
| 26 | ∞ | 1.48 | 1.51633 | 64.1 |
| 27 | ∞ | 0.40 | | |
| 28 | ∞ | 0.50 | 1.51633 | 64.1 |
| 29 | ∞ | | | |

(b) Aspheric surface coefficient $16^{th}$ surface

K = 0.0
A4 = −6.4706E−05
A6 = 2.2967E−07
A8 = −1.8920E−08
A10 = 9.2648E−10

$21^{st}$ surface

K = 0.0
A4 = 3.1423E−04
A6 = 4.9168E−06
A8 = −2.0623E−07
A10 = 1.1724E−08

$22^{nd}$ surface

K = 0.0
A4 = −4.5056E−04
A6 = 1.5194E−05
A8 = −1.2975E−06
A10 = 6.5669E−08

$23^{rd}$ surface

K = 0.0
A4 = −1.0682E−03
A6 = 3.5252E−05
A8 = −3.9488E−06
A10 = 2.2958E−07

$24^{th}$ surface

K = 0.0
A4 = −1.2968E−03
A6 = 1.6805E−05
A8 = 1.3372E−06
A10 = −1.2350E−07
A12 = −5.3338E−09

$25^{th}$ surface

K = 0.0
A4 = −1.8872E−03
A6 = 4.5053E−05
A8 = −2.6174E−07
A10 = −3.9702E−09
A12 = −1.9095E−09

(c)

| Focal length f | d9 | d14 | d17 | d21 | d23 |
|---|---|---|---|---|---|
| 6.45 | 0.60 | 14.69 | 9.85 | 3.52 | 5.84 |
| 16.65 | 7.77 | 7.52 | 3.87 | 6.20 | 9.14 |
| 42.85 | 13.89 | 1.40 | 0.70 | 7.07 | 11.44 |

The zoom lens in Example 3 is provided with first lens group G1 having positive refractive power, second lens group G2 having negative refractive power, aperture stop S (which is sometimes included in the third lens group), third lens group G3 having positive refractive power, fourth lens group G4 having positive refractive power, fifth lens group G5 having negative refractive power and sixth lens group G6 having positive refractive power, in this order from the object side along the optical axis. In a zooming operation from a wide-angle end to a telephoto end, the first lens group G1, the third lens group G3, the sixth lens group G6 and the aperture stop S are not changed in terms of a position on the optical axis, while, the second lens group G2 moves monotonously to expand a distance between the first lens group G1 and the second lens group G2 as shown by arrow A, the fourth lens group G4 moves monotonously to expand a distance between the third lens group G3 and the fourth lens group G4 as shown by arrow B and the fifth lens group G5 moves non-linearly to expand a distance between the fifth lens group G5 and the sixth lens group G6 as shown by arrow C, thus, each distance between lens groups is changed to zoom. The others of the lens groups are fixed for the zooming operation. In the focusing operation, at least the fifth lens group G5 moves to the image side of the zoom lens along the optical axis. By moving only the fifth lens group G5 for the focusing operation, it is possible to control the movement for focusing without complicating the mechanism for moving the fifth lens group G5. Incidentally, the fifth lens group and the fourth lens group may also moves as one body for focusing operation, in addition to moving the fifth lens group G5 alone for focusing operation. By doing this, a fluctuation of image point position for an amount of movement of focusing lens group in the optical axis direction can further be made small. In addition, it is not necessary that an amount of movement of the fourth lens group and that of the fifth lens group are exactly the same mutually. The fourth and fifth lens groups may moves based on an optimum amount of movement for each of the fourth and fifth lens groups determined by considering aberration performance in focusing operation for a photographic object in a short distance. Further, by arranging a mechanical shutter to be close to an aperture stop whose position on the optical axis is unchangeable, in the zooming operation from a wide-angle end to a telephoto end, a mechanism for moving this mechanical shutter becomes useless, thus, a thickness of the image pickup apparatus in its thickness direction can be reduced.

The first lens group G1 is provided with negative lens L1, prism P representing a reflection optical element having a function to bend an optical path by reflecting a light flux, positive lens L2 and positive lens L3 (each of lenses L1-L3 is a spherical lens). The second lens group G2 is provided with negative lens L4 and cemented lens L56 in which negative lens L5 and positive lens L6 are cemented. The third lens group G3 is composed only of positive glass mold lens L7 having an aspheric surface form on the object side. The fourth lens group G4 is composed only of cemented lens L8910 in which three lenses of: positive lens L8, negative lens L9 and positive glass mold lens L10 having an aspheric surface form on the object side are cemented. The fifth lens group G5 is composed only of negative plastic lens L11 having aspheric surface forms on its both sides, and the sixth lens group G6 is composed only of positive plastic lens L12 having aspheric surface forms on its both sides. Lowpass filter LPF wherein infrared blocking coating is provided on an optical surface and seal glass SG covering an imaging surface of solid-state image sensor CCD are arranged between the sixth lens group G6 and the imaging surface of the solid-state image sensor CCD. Incidentally, though the aspheric surface is arranged to be at the aforesaid position in the present example, the invention is not limited to this.

Example 4

Specifications:
Focal length: f=6.49 mm–14.46 mm–43.16 mm
Field angle: 2ω=61.6°–22.5°–8.2°
Table 9 shows a lens data of a zoom lens relating to Example 4. FIG. 9 shows a cross-sectional view of a zoom lens relating to Example 4, and FIGS. 10(A) to 10(C) show aberration diagrams of spherical aberration, astigmatism and distortion of a zoom lens relating to Example 4. In this case, FIG. 10(A) shows aberration diagrams for focal length 6.49 mm, FIG. 10(B) shows aberration diagrams for focal length 14.46 mm and FIG. 10(C) shows aberration diagrams for focal length 43.16 mm.

TABLE 9

Example 4

(a)

| i | ri | di | ndi | vdi |
|---|---|---|---|---|
| 1 | 256.432 | 0.70 | 1.80518 | 25.4 |
| 2 | 22.640 | 2.50 | | |
| 3 | ∞ | 6.65 | 1.84666 | 23.8 |
| 4 | ∞ | 6.65 | | |
| 5 | ∞ | 0.20 | | |
| 6 | 47.043 | 0.55 | 1.80518 | 25.4 |
| 7 | 27.728 | 2.34 | 1.49700 | 81.6 |
| 8 | −33.293 | 0.20 | | |
| 9 | 21.289 | 1.92 | 1.80610 | 40.9 |
| 10 | 491.877 | Variable | | |
| 11 | 790.216 | 0.55 | 1.77250 | 49.6 |
| 12 | 8.192 | 1.70 | | |
| 13 | −16.869 | 0.55 | 1.72916 | 54.7 |
| 14 | 10.175 | 1.16 | 1.92286 | 20.9 |
| 15 | 50.326 | Variable | | |
| 16 | ∞ | 0.20 | | |
| 17 | 11.250 | 1.50 | 1.58913 | 61.2 |
| 18 | 33.785 | Variable | | |
| 19 | 8.336 | 3.01 | 1.49700 | 81.6 |
| 20 | 22.707 | 1.44 | 1.84666 | 23.8 |
| 21 | 9.032 | 0.50 | | |
| 22 | 7.884 | 2.80 | 1.58913 | 61.2 |
| 23 | −75.129 | Variable | | |
| 24 | −25.971 | 0.55 | 1.79952 | 42.2 |
| 25 | 7.761 | 1.53 | 1.48749 | 70.2 |
| 26 | 95.025 | Variable | | |
| 27 | 32.990 | 3.00 | 1.53180 | 56.0 |
| 28 | −15.843 | 0.30 | | |
| 29 | ∞ | 0.42 | 1.51633 | 64.1 |
| 30 | ∞ | 0.50 | | |
| 31 | ∞ | 0.50 | 1.51633 | 64.1 |
| 32 | ∞ | | | |

(b) Aspheric surface coefficient

17$^{th}$ surface

K = 3.2892E−01
A4 = −1.1574E−04
A6 = −7.3117E−07
A8 = 5.2639E−09

22$^{nd}$ surface

K = 0.0
A4 = 4.5720E−05
A6 = 1.4855E−05
A8 = −6.8569E−08
A10 = 2.8884E−08

23$^{nd}$ surface

K = 0.0
A4 = 6.3529E−04
A6 = 3.0088E−05
A8 = −6.5105E−07
A10 = 9.2287E−08

27$^{th}$ surface

K = 4.6117E+01
A4 = −1.2585E−03
A6 = 9.9016E−06
A8 = 8.8016E−07
A10 = −6.6080E−08

TABLE 9-continued

Example 4

28$^{th}$ surface

K = −5.3318E+00
A4 = −2.0479E−03
A6 = 9.3441E−05
A8 = −1.7060E−06
A10 = −1.4630E−08

(c)

| Focal length f | d10 | d15 | d18 | d23 | d26 |
|---|---|---|---|---|---|
| 6.40 | 0.60 | 16.39 | 8.70 | 5.85 | 3.54 |
| 17.60 | 9.38 | 7.61 | 4.57 | 9.18 | 4.34 |
| 48.60 | 15.19 | 1.80 | 0.60 | 10.61 | 6.89 |

The zoom lens in Example 4 is provided with first lens group G1 having positive refractive power, second lens group G2 having negative refractive power, aperture stop S (which is sometimes included in the third lens group), third lens group G3 having positive refractive power, fourth lens group G4 having positive refractive power, fifth lens group G5 having negative refractive power and sixth lens group G6 having positive refractive power, in this order from the object side along the optical axis. In a zooming operation from a wide-angle end to a telephoto end, the first lens group G1, the third lens group G3, the sixth lens group G6 and the aperture stop S are not changed in terms of a position on the optical axis, while, the second lens group G2 moves monotonously to expand a distance between the first lens group G1 and the second lens group G2 as shown by arrow A, the fourth lens group G4 moves monotonously to expand a distance between the third lens group G3 and the fourth lens group G4 as shown by arrow B and the fifth lens group G5 moves non-linearly to expand a distance between the fifth lens group G5 and the sixth lens group G6 as shown by arrow C, thus, each distance between lens groups is changed to zoom. The others of the lens groups are fixed for the zooming operation. In the focusing operation, at least the fifth lens group G5 moves to the image side of the zoom lens along the optical axis. By moving only the fifth lens group G5 for the focusing operation, it is possible to control the movement for focusing without complicating the mechanism for moving the fifth lens group G5. Incidentally, the fifth lens group and the fourth lens group may also moves as one body for focusing operation, in addition to moving the fifth lens group G5 alone for focusing operation. By doing this, a fluctuation of image point position for an amount of movement of focusing lens group in the optical axis direction can further be made small. In addition, it is not necessary that an amount of movement of the fourth lens group and that of the fifth lens group are exactly the same mutually. The fourth and-fifth lens groups may moves based on an optimum amount of movement for each of the fourth and fifth lens groups determined by considering aberration performance in focusing operation for a photographic object in a short distance. Further, by arranging a mechanical shutter to be close to an aperture stop whose position on the optical axis is unchangeable, in the zooming operation from a wide-angle end to a telephoto end, a mechanism for moving this mechanical shutter becomes useless, thus, a thickness of the image pickup apparatus in its thickness direction can be reduced.

The first lens group G1 is provided with negative lens L1, prism P representing a reflection optical element having a function to bend an optical path by reflecting a light flux, positive lens L2 in which negative lens L2A and positive lens L2B are cemented, and with positive lens L3 (each of lenses L1-L3 is a spherical lens). The second lens group G2 is provided with negative lens L4 and cemented lens L56 in which negative lens L5 and positive lens L6 are cemented. The third lens group G3 is composed only of positive glass mold lens L7 having an aspheric surface form on the object side. The fourth lens group G4 is provided with positive lens L89 in which positive lens L8 and negative lens L9 are cemented and with positive glass mold lens L10 having an aspheric surface form on the image side. The fifth lens group G5 is composed only of positive lens L11 in which negative lens L11A and positive lens 11B are cemented and the sixth lens group G6 is composed only of positive plastic lens L12 having aspheric surface forms on its both sides. Infrared blocking filter IRCF wherein infrared blocking coating is provided on an optical surface and seal glass SG covering an imaging surface of solid-state image sensor CCD are arranged between the sixth lens group G6 and the imaging surface of the solid-state image sensor CCD. Incidentally, though the aspheric surface is arranged at the aforesaid position in the present example, the invention is not limited to this.

Table 10 shows collectively values of expressions (1) to (4), (6) and (7) corresponding to the aforesaid examples. In this case, $\beta_{MAX}$ in each example shows the maximum value of a lateral magnification of the fifth lens group (the focusing lens group) and the sixth lens group under a condition that a focus of the zoom lens is adjusted to an object at infinity distance, between the wide-angle end and the telephoto end of the zoom lens.

TABLE 10

| | Expression (1) $\dfrac{\beta_{MAX}}{\sqrt{f_W \times f_T}}$ | Expression (2) $n_{2P}$ | Expression (3) $\nu_{2P}$ | Expression (4) $\nu_{1P}$ | Expression (6) L/V | Expression (7) $\dfrac{PL}{\sqrt{f_W \times f_T}}$ |
|---|---|---|---|---|---|---|
| Example 1 | 0.09 | 1.92 | 20.9 | 81.6 | 10.56 | 0.69 |
| Example 2 | 0.12 | 1.92 | 20.9 | 81.6 | 10.53 | 0.69 |
| Example 3 | 0.07 | 1.92 | 20.9 | 81.6 | 11.46 | 0.72 |
| Example 4 | 0.10 | 1.92 | 20.9 | 81.6 | 10.27 | 0.75 |

What is claimed is:

1. A zoom lens for zooming by moving a plurality of lens groups comprising, in order from an object side thereof along an optical axis:
    a first lens group having a positive refractive power whose position on the optical axis is fixed during a zooming operation and a focusing operation;
    a second lens group having a negative refractive power;
    a third lens group having a positive refractive power;
    a fourth lens group having a positive refractive power;
    a fifth lens group having a negative refractive power; and
    a sixth lens group having a positive refractive power,
    wherein the first lens group comprises a reflection optical element for bending an optical path by reflecting a light flux,
    at least the fifth lens group is used for focusing on an object at a finite distance, and
    the zoom lens satisfies:

$$0.05 < \frac{\beta_{MAX}}{\sqrt{f_W \times f_T}} < 0.14$$

where $\beta_{MAX}$ is a maximum lateral magnification of lens groups from a focusing lens group to an end lens group in the zoom lens under a condition that a focus of the zoom lens is adjusted to an object at infinity distance, between a wide-angle end and a telephoto end of the zoom lens,
$f_W$ (mm) is a focal length of the zoom lens at the wide-angle end, and
$f_T$ (mm) is a focal length of the zoom lens at the telephoto end.

2. The zoom lens of claim 1,
wherein a position of the third lens group on the optical axis is fixed for a zooming operation and a focusing operation.

3. The zoom lens of claim 1,
wherein the third lens group consists of:
    one positive lens including at least one surface in an aspherical shape; and
    an aperture stop arranged at an object side or an image side of the positive lens along the optical axis.

4. The zoom lens of claim 1,
wherein the second lens group comprises two negative lenses and one positive lens.

5. The zoom lens of claim 1,
wherein the second lens group comprises a positive lens satisfying following conditional expressions:

$n_{2P} > 1.80$ and $\nu_{2P} < 26.0$, where $n_{2P}$ is a refractive index of the positive lens of the second lens group for d line, and $\nu_{2P}$ is an Abbe constant of the positive lens of the second lens group for d line.

6. The zoom lens of claim 1,
wherein the first lens group comprises a positive lens satisfying a following conditional expression:

$\nu_{1P} > 80$, where $\nu_{1P}$ is an Abbe constant of the positive lens of the first lens group for d line.

7. The zoom lens of claim 1,
wherein each lens in the first lens group is a spherical lens.

8. The zoom lens of claim 1,
wherein the fifth lens group consists of one plastic lens including at least one surface in an aspherical shape.

9. The zoom lens of claim 1,
wherein the fourth lens group consists of a cemented lens formed of three lenses being a positive lens, a negative lens, and a positive lens, in order from the object side of the zoom lens.

10. An image pickup apparatus comprising the zoom lens of claim 1.

* * * * *